United States Patent
Chiu

(10) Patent No.: US 7,650,439 B2
(45) Date of Patent: Jan. 19, 2010

(54) FALLING PROTECTIVE DEVICE FOR HARD DISK OF A PORTABLE COMPUTER

(75) Inventor: Chai-Chang Chiu, Tucheng (TW)

(73) Assignee: Getac Technology Corporation, Hsinchu (TW)

( * ) Notice: Subject to any disclaimer, the term of this patent is extended or adjusted under 35 U.S.C. 154(b) by 56 days.

(21) Appl. No.: 11/898,082

(22) Filed: Sep. 10, 2007

(65) Prior Publication Data

US 2009/0070888 A1    Mar. 12, 2009

(51) Int. Cl.
*G06F 3/00* (2006.01)
(52) U.S. Cl. .................. 710/14; 702/141; 360/75; 713/310
(58) Field of Classification Search .............. 710/260, 710/15, 17, 19, 14; 702/141; 360/75; 713/310
See application file for complete search history.

(56) References Cited

U.S. PATENT DOCUMENTS 5,227,929 A * 7/1993 Comerford ............... 360/75

7,496,470 B2 * 2/2009 Nakamura et al. ........... 702/141
2009/0027798 A1 * 1/2009 Shu et al. ................. 360/75

FOREIGN PATENT DOCUMENTS

KR    20040017083    2/2004

* cited by examiner

*Primary Examiner*—Clifford H Knoll
(74) *Attorney, Agent, or Firm*—Quintero Law Office, PC

(57) ABSTRACT

A falling protective device for protecting a hard disk of a falling portable computer against damages includes a falling sensor arranged in the portable computer for generating and sending an interrupt signal to a keyboard controller in response to a detected falling state of the computer. An SMI signal line is extended between and connected to the keyboard controller and a system BIOS of the computer. On receipt of the interrupt signal generated by the falling sensor, the keyboard controller sends an SMI signal via the SMI signal line to the system BIOS, which in turn sends a park control signal to park the hard disk or a power-off control signal to terminate the supply of working power to the hard disk. The system BIOS sends a polling signal via a polling signal line to the keyboard controller, so as to poll about a state signal of a default status bit in a default signal port of the keyboard controller.

12 Claims, 4 Drawing Sheets

FALLING PROTECTIVE DEVICE FOR HARD DISK OF A PORTABLE COMPUTER

FIELD OF THE INVENTION

The present invention relates to a protective device for a hard disk of a portable computer, and more particularly to a falling protective device for a hard disk of a portable computer.

BACKGROUND OF THE INVENTION

Computer apparatus have been widely employed in factories, business offices, and homes. With the use or the help of computer apparatus, it is possible to obtain the highest working efficiency, the optimal advertising effect, and the most convenient living conditions. Particularly, in recent years, the popularization of portable or notebook computer has brought even increased conveniences to users.

However, the portable or notebook computer is subject to undesirable falling due to poor working environment, user negligence, or improper use of the computer, which would adversely affect the normal operation of the portable computer and result in damage of precision devices in the computer, including the hard disk thereof, and data in the damaged hard disk would be destroyed. To protect the hard disk of a portable computer from damages in falling or violent vibration, some portable computers are incorporated with a falling sensor.

There are various techniques of prior art for detecting and protecting a computer from possible damage at falling. For example, Taiwan Utility Model No. M298215 discloses a storage device with power failure protection. The storage device includes a sensing unit for sensing a displacement of the device in at least one dimension; a processor coupled with the sensing unit for receiving the displacement and then outputting a control signal; a medium unit coupled with the processor for reading or setting data; and a switch respectively coupled with the processor and the medium unit for receiving the control signal to turn on or off power supplied to the medium unit.

U.S. Pat. No. 5,982,573 discloses a disk drive having a fall detection control system that detects when a disk drive is in a free fall, and takes precautionary protective action to minimize physical damage from any resulting shock upon impact. The disk drive includes an accelerometer device that measures acceleration of the disk drive along three mutually orthogonal axes x, y, and z and resolves the measurement into respective x, y, and z vectors. In a method disclosed in the prior art, to minimize shock-induced damage of the disk drive, the acceleration of the falling disk drive is detected; the detected acceleration is compared with a selected acceleration threshold level; a duration that the detected acceleration exceeds the acceleration threshold level is measured; the measured duration is compared with a selected reference time period; and a warning signal is output when the measured duration exceeds the reference time period. Upon receipt of the warning signal, a controller initiates protective routines in preparation for shock.

U.S. Pat. No. 5,227,929 discloses a protective reflex system for a portable computer hard disk. The portable computer hard disk protective reflex system includes a three axis accelerometer, a dedicated processor, and a central processing unit of the portable computer. The accelerometer detects changes in the acceleration of the portable computer and generates a signal to the dedicated processor, informing the dedicated processor to tell the central processing unit of the portable computer to park the disk heads.

U.S. Pat. No. 5,235,472 discloses an apparatus for sensing operating shock on a disk drive. The apparatus comprises a piezoelectric polymer film, an amplifier and a comparator. The piezoelectric polymer film is encapsulated and electrically shielded by a metallic or metallic coated package, for sensing shock loads generated by or applied to the disk drive and generating a voltage to the amplifier for amplification and then to the comparator for comparison with a predetermined threshold voltage. The control circuit accordingly issues a write fault signal when the detected signal exceeds the predetermined threshold voltage, to stop writing of the read/write heads. The device may be mounted on the computer disk drive of the unit in such a manner as to be at a 45 degree angle to each of the x, y and z axis of the orthogonal coordinate system so that linear and torsional forces may be monitored.

U.S. Pat. No. 5,333,138 discloses an apparatus and method for preventing data corruption in disk drives from mechanical shock during write operations. The apparatus comprises includes a mechanical shock sensor to sense mechanical shocks having a magnitude exceeding a predetermined threshold. When a mechanical shock is detected, a write disable circuitry interrupts the write current to the disk drive write head. A repositioning circuitry then repositions the data head over the original data track and the incomplete data that was interrupted by the mechanical shock is rewritten. The method disclosed in the prior art includes the steps of sensing a mechanical shock having a magnitude exceeding a predetermined threshold; storing information identifying the data being written at the onset of the sensed shock; interrupting the write current to the write head; repositioning the data head to the original track; and rewriting the data which was interrupted because of the sensed shock.

The falling sensor in U.S. Pat. No. 6,771,449 includes a tubular conductive member, a flexible member arranged inside the tubular conductive member, and a weight arranged to an edge of the beam. The weight contacts the conductive member at the deflected state (the normal state) of the flexible member, and the weight comes out of contact with the conductive member during a falling of the magnetic disk drive. On detecting the falling state, the drive activates an evacuating operation to evacuate the magnetic head by the unload mechanism. Therefore, demolitions of the magnetic head and the magnetic disk by a crush between the magnetic head and the magnetic disk, which is caused by a shock at the end of falling, can be avoided.

Further, a protection apparatus for hard disk drive unit of a portable computer is disclosed. The device senses the acceleration of the computer when the computer is in a free fall, and a control microprocessor of the disk drive unit determines that such state lasts for longer than a certain minimum of time. Upon these conditions being met, the control microprocessor signals the removal of the heads from the disk to park the heads.

However, these prior art techniques are usually uneasy to effectuate; some of them necessitate modification of an internal structure of the hard disk, while others require a special and specific processor to achieve the protection of the hard disk of a falling portable computer.

SUMMARY OF THE INVENTION

It is therefore a primary object of the present invention to provide a falling protective device for a hard disk of a portable computer, from which an interrupt signal is sent to a keyboard controller of a falling portable computer, and a system BIOS (basic input/output system) of the computer operates in cooperation with the keyboard controller to achieve the protection of the falling portable computer against damages to the hard disk.

Another object of the present invention is to provide a falling protective device for a hard disk of a portable computer, with which polling about the state of a hard disk of a falling portable computer is continuously proceeded with. For this purpose, a polling signal line is extended between and connected to a keyboard controller and a system BIOS of the portable computer, and the system BIOS is able to send a polling signal via the polling signal line to poll about a state signal of a default status bit in a default signal port of the keyboard controller, so as to determine whether to park or un-park the hard disk.

To fulfill the above objects, the present invention provides a falling protective device for portable computer. The falling protective device includes a falling sensor arranged in the portable computer for generating and sending an interrupt signal to a keyboard controller in response to a detected falling state of the computer. An SMI signal line is extended between and connected to the keyboard controller and a system BIOS of the computer. On receipt of the interrupt signal generated by the falling sensor, the keyboard controller sends an SMI signal via the SMI signal line to the system BIOS, which in turn sends a park control signal to park the hard disk or a power-off control signal to terminate the supply of working power to the hard disk. The system BIOS sends a polling signal via a polling signal line to the keyboard controller, so as to poll about a state signal of a default status bit in a default signal port of the keyboard controller.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
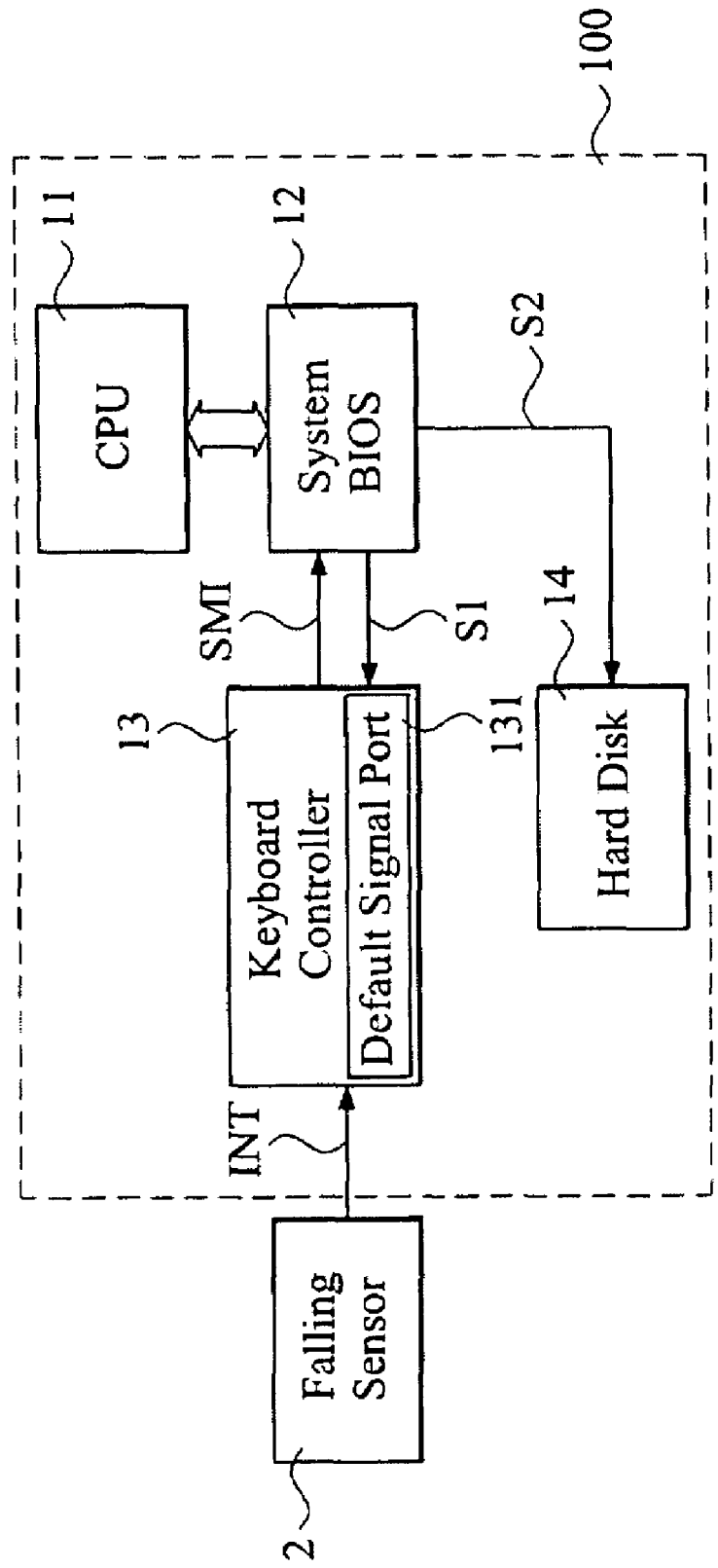
FIG. 1 is a system block diagram showing the connection of a falling protective device for a hard disk of a portable computer according to a first embodiment of the present invention.

Please refer to FIG. 1 that is a system block diagram showing the connection of a falling protective device for a hard disk of a portable computer according to a first embodiment of the present invention. As shown, in a simplified portable computer 100, there are included a central processing unit (CPU) 11, a system BIOS (Basic Input/Output System) 12, a keyboard controller 13, a hard disk (HD) 14, and other parts, such as system memory, bridge, bus, display interface, etc. Generally, a keyboard and a computer mouse are connected to the keyboard controller 13.

The keyboard controller 13 is connected to the portable computer 100 via a bus and a default data transmission port, and there is an SMI (system management interrupt) signal line and a polling signal line extended between and connected to the keyboard controller 13 and the system BIOS 12. The keyboard controller 13 may send an SMI signal SMI to the system BIOS 12 via the SMI signal line, and the system BIOS 12 may send a polling signal S1 via the polling signal line for polling about a state signal of a default signal port 131 of the keyboard controller 13. In the default signal port 131, there is included at least a default status bit standing for a state that an interrupt signal has been sent out by a falling sensor. In a typical notebook computer currently available in the market, the default signal port 131 of the keyboard controller 13 may be signal port 6C, for example, and the default status bit in the signal port 6C is bit 7.

The hard disk 14 is connected to the portable computer 100 via a bus, such as an IDE interface bus, and a default data transmission port; and the system BIOS 12 may send a parking control signal S2 to the hard disk 14 via a signal line, so as to drive the hard disk 14 to park or to un-park.

A falling sensor 2 is connected to the keyboard controller 13 via a signal line. When the falling sensor 2 senses a falling state of the portable computer 100, that is, when the falling sensor 2 detects an acceleration signal that exceeds a preset acceleration signal level, an interrupt signal INT is triggered by the falling sensor 2 to the keyboard controller 13. A reasonable acceleration value range may be set through the keyboard controller 13 and used by the falling sensor 2 as a preset acceleration signal level for determining whether a falling state exists or not.

In a preferred embodiment of the present invention, the falling sensor 2 may be an accelerometer, and preferably, a three axis accelerometer, for detecting acceleration signals in three axis directions and determining whether any one of the detected acceleration signal exceeds the preset acceleration signal level, so as to send out an interrupt signal INT to the keyboard controller 13 when it is determined the detected acceleration signal exceeds the preset acceleration signal level.

Figure 2:
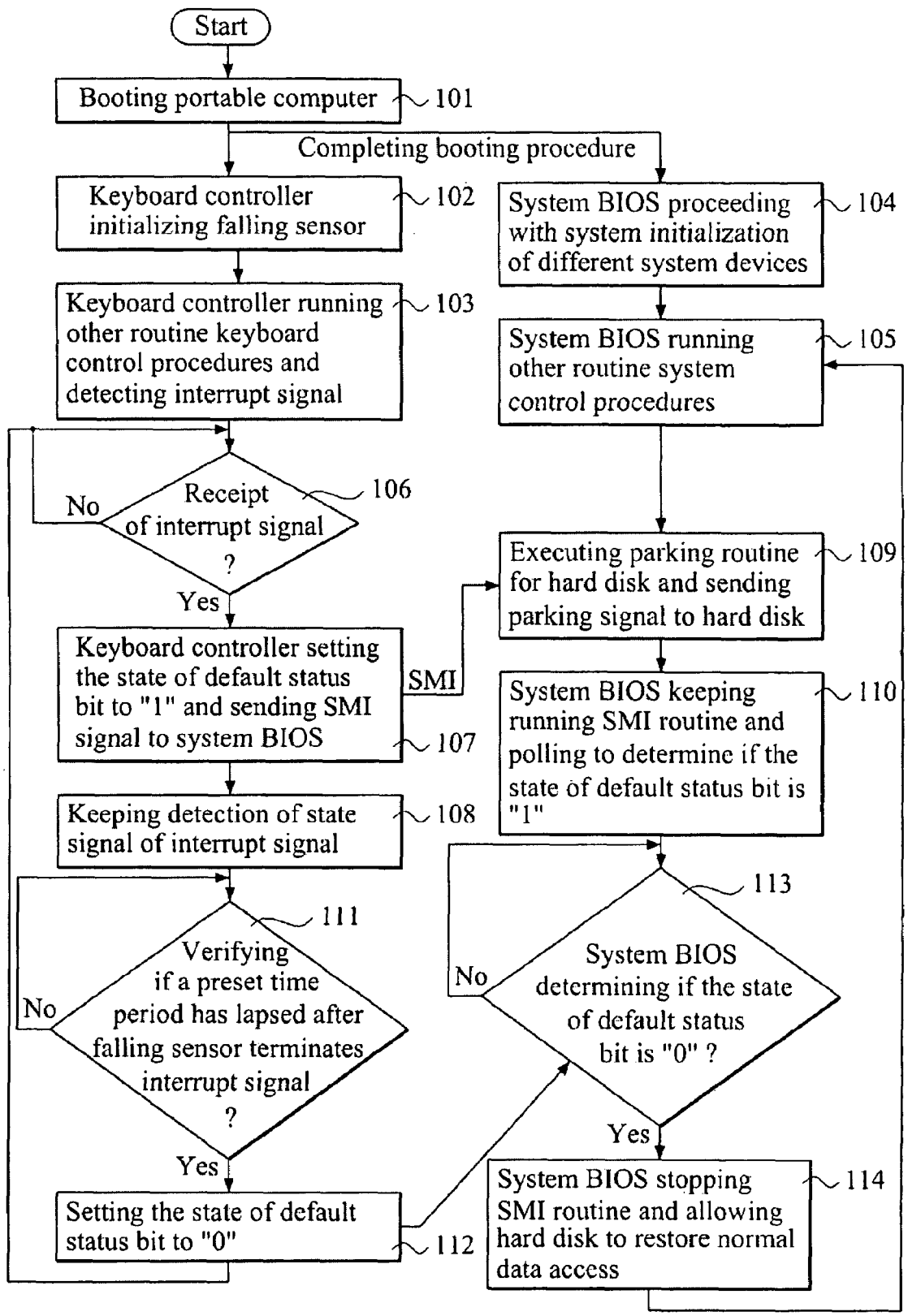
FIG. 2 is a control flowchart showing the operation of the falling protective device according to the first embodiment of the present invention.

FIG. 2 is a control flowchart showing the operation of the falling protective device according to the first embodiment of the present invention. Please refer to FIGS. 1 and 2 at the same time. When the portable computer 100 is booted (step 101), the keyboard controller 13 starts the initialization of the falling sensor 2 (step 102). In step 102, the falling sensor 2 is initialized via the keyboard controller 13, and a reference value is set to the falling sensor 2 as a preset acceleration signal level for determining whether there is a falling state. Then, the keyboard controller 13 starts running other routine keyboard control procedures, including battery detection, keyboard detection, etc., and detects whether the falling sensor 2 sends out any interrupt signal INT (step 103). When the keyboard controller 13 completes the setting of various parameters, it enters into an alert state of detecting for the interrupt signal sent from the falling sensor 2.

When the keyboard controller 13 completes the booting procedure, the system BIOS 12 also proceeds with system initialization of different system devices (step 104), and starts running other routine system control procedures (step 105), such as the setting and driving of buses, hard disk, display device, etc.

When the portable computer 100 is in a falling state and the falling sensor 2 senses an acceleration signal that exceeds the preset acceleration signal level, an interrupt signal is sent by the falling sensor 2 to the keyboard controller 13. On receipt of the interrupt signal INT generated by the falling sensor 2

(step 106), the keyboard controller 13 sets the state of the default status bit (that is, bit 7) in the default signal port 131, such as port 6C, to a high level signal state of "1", and sends an SMI signal to the system BIOS 12 (step 107). Then, the keyboard controller 13 will keep running other routine functions as well as keep detecting the state signal of the interrupt signal INT (step 108).

On receipt of the SMI signal generated by the keyboard controller 13, the system BIOS 12 immediately executes a parking routine for hard disk parking, and sends a parking signal to the hard disk 14 (step 109). At this point, the hard disk 14 moves a read-write head thereof away from the platters of the hard disk 14, so as to forbid the access of data on the hard disk. That is, the hard disk 14 is not available for data access now. Thereafter, the system BIOS 12 keeps running an SMI routine and continues polling to check whether the state of the default status bit of the default signal port 131 is changed to a low level signal state of "0" (step 110).

When the falling sensor 2 detects and verifies that the acceleration value falls below the preset acceleration signal level, it stops sending the interrupt signal INT. And, when it detects that a preset time period, such as five seconds, has lapsed after the falling sensor 2 stopped sending the interrupt signal INT (step 111), the keyboard controller 13 sets the state of the default status bit (i.e. bit 7) in the default signal port 131 (i.e. port 6C) to "0" (step 112). When the system BIOS 12 detects that the state of the default status bit in the default signal port 131 is set to "0" (step 113), the system BIOS 12 immediately stops running the SMI routine, allowing the hard disk 14 to restore the normal data access (step 114).

Figure 3:
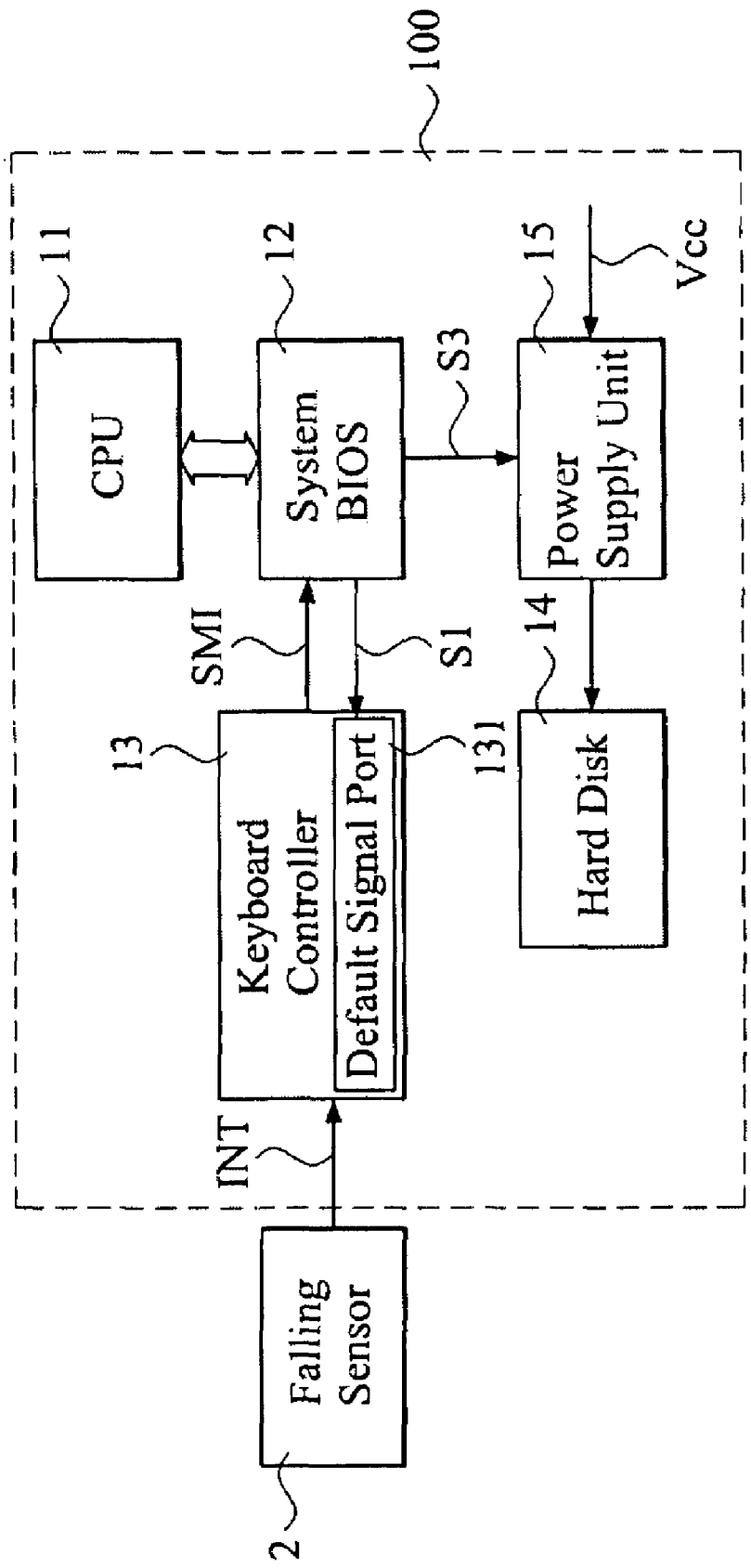
FIG. 3 is a system block diagram showing the connection of a falling protective device for a hard disk of a portable computer according to a second embodiment of the present invention.

FIG. 3 is a system block diagram showing the connection of a falling protective device of a hard disk of a portable computer according to a second embodiment of the present invention. Since the second and the first embodiment are generally similar in terms of system configuration and working manner thereof, components and signals that are the same in the two embodiments are denoted by the same reference numeral/letters. The second embodiment is different from the first embodiment in that the system BIOS 12 in the second embodiment is able to send out a power-off control signal S3 to control a power supply unit 15 to stop supplying working power Vcc to the hard disk 14.

Figure 4:
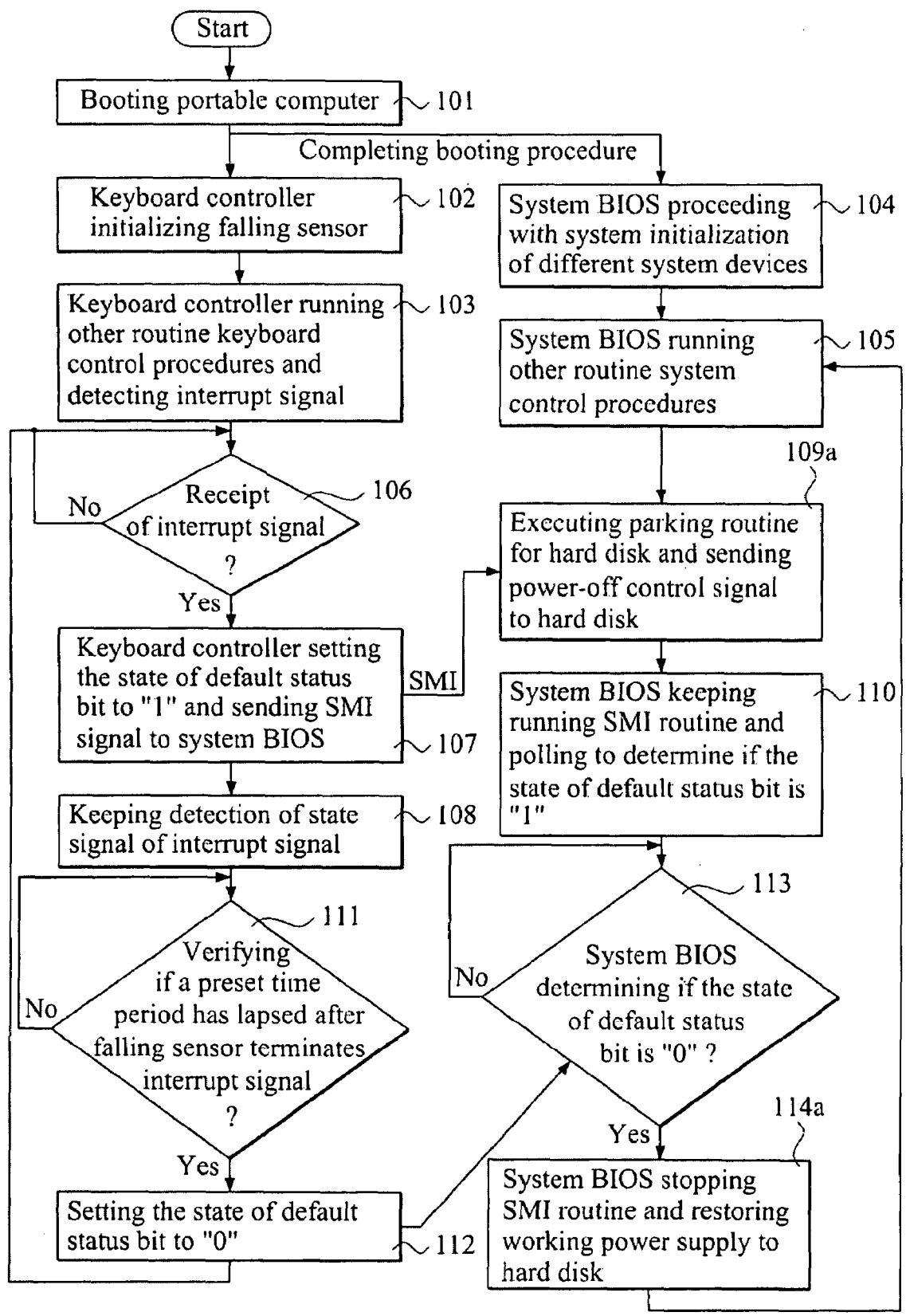
FIG. 4 is a control flowchart showing the operation of the falling protective device according to the second embodiment of the present invention.

FIG. 4 is a control flowchart showing the operation of the falling protective device according to the second embodiment of the present invention. When the portable computer 100 is booted (step 101), the keyboard controller 13 starts the initialization of the falling sensor 2 (step 102). In step 102, the falling sensor 2 is initialized via the keyboard controller 13, and a reference value is set to the falling sensor 2 as a preset acceleration signal level for determining whether there is a falling state. Then, the keyboard controller 13 starts running other routine keyboard control procedures, including battery detection, keyboard detection, etc., and detects whether the falling sensor 2 sends out any interrupt signal INT (step 103). When the keyboard controller 13 has completed the setting of various parameters, it enters into an alert state of detecting for the interrupt signal sent out from the falling sensor 2.

When the keyboard controller 13 completes the booting procedure, the system BIOS 12 also proceeds with system initialization of different system devices (step 104), and starts running other routine system control procedures (step 105), such as the setting and driving of buses, hard disk, display device, etc.

When the portable computer 100 is in a falling state and the falling sensor 2 senses an acceleration signal that exceeds the preset acceleration signal level, an interrupt signal is sent by the falling sensor 2 to the keyboard controller 13. On receipt of the interrupt signal INT generated by the falling sensor 2, (step 106), the keyboard controller 13 sets the state of the default status bit (that is, bit 7) in the default signal port 131, such as port 6C, to a high level signal state of "1", and sends an SMI signal to the system BIOS 12 (step 107). Then, the keyboard controller 13 will keep running other routine functions as well as keep detecting the state signal of the interrupt signal INT (step 108).

On receipt of the SMI signal generated by the keyboard controller 13, the system BIOS 12 immediately executes a parking routine for hard disk parking, and sends a power-off control signal S3 to the hard disk 14 (step 109a). At this point, the working power Vcc to the hard disk 14 is terminated. That is, the hard disk 14 is not available for data access now. Thereafter, the system BIOS 12 keeps running the SMI Routine and continues polling whether the state of the default status bit of the default signal port 131 is changed to a low level signal state of "0" (step 110).

When the falling sensor 2 detects and verifies that the acceleration value falls below the preset acceleration signal level, it stops sending the interrupt signal INT. And, when it detects that a preset time period, such as five seconds, has lapsed after the falling sensor 2 stopped sending the interrupt signal INT (step 111), the keyboard controller 13 sets the state of the default status bit (i.e. bit 7) in the default signal port 131 (i.e. port 6C) to "0" (step 112). When the system BIOS 12 detects that the keyboard controller 13 the state of the default status bit in the default signal port 131 is set to "0" (step 113), the system BIOS 12 immediately stops running the SMI routine, and restores the supply of the working power Vcc to the hard disk 14 (step 114a).

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A falling protective device for protecting a hard disk of a falling portable computer including a central processing unit (CPU), a system basic input/output system (BIOS), and a keyboard controller, the falling protective device comprising:
   a falling sensor arranged in the portable computer for detecting a falling state of the portable computer and generating an interrupt signal in response to the detected falling state, and the generated interrupt signal being sent to the keyboard controller via a signal line; and
   an SMI (system management interrupt) signal line extended between and connected to the keyboard controller and the system BIOS;
   whereby the keyboard controller and system BIOS are configured such that when the keyboard controller receives the interrupt signal generated by the falling sensor, the keyboard controller sends an SMI signal to the system BIOS via the SMI signal line, and the system BIOS in turn sends a park control signal to the hard disk so as to forbid access of data on the hard disk and a HD power-off control signal to the hard disk to terminate the power supply to the hard disk, and after a preset time period has lapsed after the falling sensor has stopped sending the interrupt signal to the keyboard controller, the system BIOS restores normal data access to the hard disk.

2. The falling protective device as claimed in claim 1, wherein the portable computer is a notebook computer.

3. The falling protective device as claimed in claim 1, wherein the falling sensor is an accelerometer.

4. The falling protective device as claimed in claim 3, wherein the falling sensor is a three axis accelerometer.

5. The falling protective device as claimed in claim 1, wherein the keyboard controller is connected to the system BIOS via a default signal port; the default signal port including at least a default status bit standing for a state that an interrupt signal is sent by the falling sensor;

and wherein a polling signal line is extended between and connected to the signal port and the system BIOS, and the system BIOS sends a polling signal via the polling signal line to poll about a state signal of the default status bit in the default signal port of the keyboard controller.

6. A falling protective device for a hard disk of a portable computer including a central processing unit (CPU), a system basic input/output system (BIOS), and a keyboard controller, the falling protective device comprising:

a falling sensor arranged in the portable computer for detecting a falling state of the portable computer and generating an interrupt signal in response to the detected falling state, and the generated interrupt signal being sent to the keyboard controller via a signal line; and an SMI (system management interrupt) signal line extended between and connected to the keyboard controller and the system BIOS;

a power supply unit supplying power to the hard disk;

whereby the keyboard controller and system BIOS are configured such that when the keyboard controller receives the interrupt signal generated by the falling sensor, the keyboard controller sends an SMI signal to the system BIOS via the SMI signal line, and the system BIOS in turn sends a HD power-off control signal to the power supply unit to terminate the power supply to the hard disk.

7. The falling protective device as claimed in claim 6, wherein the portable computer is a notebook computer.

8. The falling protective device as claimed in claim 6, wherein the falling sensor is an accelerometer.

9. The falling protective device as claimed in claim 8, wherein the falling sensor is a three axis accelerometer.

10. The falling protective device as claimed in claim 6, wherein the keyboard controller is connected to the system BIOS via a default signal port; the default signal port including at least a default status bit standing for a state that an interrupt signal is sent by the falling sensor;

and wherein a polling signal line is extended between and connected to the signal port and the system BIOS, and the system BIOS sends a polling signal via the polling signal line to poll about a state signal of the default status bit in the default signal port of the keyboard controller.

11. The falling protective device as claimed in claim 6, wherein when the keyboard controller sends the SMI signal to the system BIOS via the SMI signal line, and the system BIOS executes a parking routine for the hard disk drive.

12. The falling protective device as claimed in claim 6, wherein after a preset time period has lapsed after the falling sensor has stopped sending the interrupt signal to the keyboard controller, the system BIOS restores power to the hard disk.

* * * * *